United States Patent
Hanazawa et al.

(10) Patent No.: US 6,906,115 B2
(45) Date of Patent: Jun. 14, 2005

(54) SURFACE TREATMENT COMPOSITION AND PREPARATION THEREOF

(75) Inventors: Makoto Hanazawa, Settsu (JP); Yasuo Itami, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/481,772

(22) PCT Filed: Jun. 10, 2002

(86) PCT No.: PCT/JP02/05713

§ 371 (c)(1),
(2), (4) Date: Dec. 23, 2003

(87) PCT Pub. No.: WO03/002628

PCT Pub. Date: Jan. 9, 2003

(65) Prior Publication Data

US 2004/0181008 A1 Sep. 16, 2004

(30) Foreign Application Priority Data

Jun. 27, 2001 (JP) ........................................ 2001-195080

(51) Int. Cl.$^7$ ............................................. C08G 18/62
(52) U.S. Cl. ..................... 522/97; 526/247; 428/421; 524/792; 528/70
(58) Field of Search .................... 522/97; 526/247; 428/421; 524/792; 528/70

(56) References Cited

FOREIGN PATENT DOCUMENTS

| EP | 812891 A2 | 12/1997 |
|---|---|---|
| EP | 851246 A1 | 7/1998 |
| EP | 1059319 A2 | 12/2000 |
| JP | 10-7751 A | 1/1998 |
| JP | 10-72568 A | 3/1998 |
| JP | 10-197731 A | 7/1998 |
| JP | 11-124514 A | 5/1999 |
| JP | 2001-19736 A | 1/2001 |
| JP | 2002-30150 A | 1/2002 |
| WO | WO 99/20671 A1 | 4/1999 |

OTHER PUBLICATIONS

English translation of the International Preliminary Examination Report for PCT/JP02/05713 dated Mar. 24, 2003.

R. Bongiovanni, et al., Surface properties of methacrylic copolymers containing perfluoropolyether structure, Polymer 42 (2001) pp. 2299–2305.

International Search Report for PCT/JP02/05713 dated Aug. 27, 2002.

Primary Examiner—Rachel Gorr
(74) Attorney, Agent, or Firm—Sughrue Mion, PLLC

(57) ABSTRACT

A perfluoropolyether-containing composition, which can easily conform to a fluorine-free substrate and can form a film on a surface of the substrate to fix the composition to the substrate surface, wherein the composition is a carbon-carbon double bond-containing composition comprising (A) a triisocyanate prepared by trimerizing a diisocyanate, and (B) a combination of at least two active hydrogen-containing compounds, and the component (B) comprises (B-1) a perfluoropolyether having at least one active hydrogen, and (B-2) a monomer having active hydrogen and a carbon-carbon double bond.

25 Claims, No Drawings

SURFACE TREATMENT COMPOSITION AND PREPARATION THEREOF

FIELD OF THE INVENTION

The present invention relates to a composition containing a carbon-carbon double bond and a perfluoropolyether group, and a method of preparing the same. The composition of the present invention has the addition polymerizability and is useful as a surface treatment agent.

RELATED ART

Perfluoroalkyl compounds, particularly perfluoropolyether derivatives have low surface energy and unique properties, and thus are used for modifying surfaces of substrates by coating the surfaces. Because of the low surface energy, the perfluoroalkyl compounds do not have the affinity with fluorine-free materials and are repelled from a surface of a substrate so that a film is not formed or even if the film is formed, the film cannot be sufficiently fixed to the surface. Disadvantageously, when the perfluoropolyether is added to the fluorine-free coating agent used for the surface protection, the perfluoropolyether separates from a fluorine-free coating agent, cannot be homogeneously dispersed in the fluorine-free coating agent, and gives nonhomogeneous surface film having a sea-island structure so that sufficient surface properties cannot be obtained, and particularly in an application requiring transparency, the perfluoropolyether cannot be used because of inability of giving the transparent homogeneous film.

It is proposed that the ends of the perfluoropolyether (PFPE) are modified with a silane compound and the PFPE is fixed by utilizing the reaction between a silanol group and a hydroxyl group, in order to fix the PFPE to the surface of the substrate. In this case, because the linkage between the silanol group and the hydroxyl group is used, the substrate is limited to glass, a silicone and a metal oxide film.

In order to form a film which is not easily peeled from the various substrate surfaces, there is a method wherein a conventional acrylic monomer is polymerized to give a surface film as in, for example, an acrylic hard coating agent. If the PFPE derivatives compatible and copolymerizable with the acrylic hard coating agents can be obtained, the combination of the acrylic hard coating agents and the PFPE derivatives gives surface treatment agents used for various substrates. This method is universal as the surface modification method, and is costly advantageous since the conventional acrylic monomer is used as the main component of the film so that the use amount of the expensive PFPE is decreased. In addition, the combination of various monomers can vary the properties of the resultant polymer film.

JP-A-10-72568 (Examples 5 and 10) proposes that an ethyl isocyanate methacrylate modified product of PFPE having a hydroxyl group at an end is added to bisphenol A-dihydroxyethyl acrylate and is copolymerized and fixed. The addition amount of the PFPE is only at most 1% by weight. This proposal has the limitations that a methacrylic hydrocarbon group portion of the perfluoropolyether modified with ethyl isocyanate methacrylate is small in comparison with a fluoroalkyl group portion and a single substance is repelled from the substrate and has poor compatibility with common fluorine-free acrylate monomers and hydrocarbon solvents so that the type of the compatible monomers is limited so that it cannot be added to the coating agent having the composition adjusted to each application and, if it is added in a high concentration, a pre-cure solution easily phase separates and a homogeneous film cannot be obtained. When utilizing a film as a transparent protection layer used for an optical application, it is necessary to make the protection film thin and the surface modification effect cannot be easily exhibited unless it is added in a high concentration.

Polymer 42 (2001) 2299–2305 discloses a copolymer of methyl methacrylate and an ethyl isocyanate methacrylate modified product of PFPE having a hydroxyl group at an end. However, because the ethyl isocyanate methacrylate modified product of PFPE having a hydroxyl group at an end cannot be dissolved in hydrocarbon solvents, this copolymer is copolymerized in a fluorinated solvent such as 1,1,2-trichlorotrifluoroethane which is abolished and trifluorotoluene which is expensive, and this copolymer can give a film by means of fluorine-free media only in the form of the copolymer and thus the freeness of film properties is poor. The substrate which can be coated with the copolymer is limited. Because the copolymer alone can be incorporated into the coating agent, compatible coating agents are limited, and tough and homogeneous film cannot be easily obtained.

JP-A-2001-19736 proposes a method of introducing an addition polymerizable group having an active hydroxyl group for the purpose of modifying an oligourethane having a perfluoropolyether segment with a crosslinkable functional group. The main component of the surface protection film, however, is the oligourethane (a PFPE-containing urethane crosslinked product), and this method has limited properties, for example, is unsuitable for the application requiring the hardness. This method does not provide a protection film by the addition to a conventional addition-polymerizable coating agent.

SUMMARY OF THE INVENTION

An object of the present invention is to provide a PFPE derivative which can easily conform with a fluorine-free substrate and can form a film on a substrate surface and can be fixed to the substrate surface.

Another object of the present invention is to provide a perfluoropolyether-containing surface modification agent which can form a homogeneous film, particularly a transparent film on a substrate surface and which can be fixed to a substrate by the cure (for example, homopolymerization or copolymerization) after the film formation.

The present inventors found that when a perfluoropolyether (PFPE) derivative has, in its molecule, a functional group having the affinity with a fluorine-free material and the addition polymerizability, the derivative can easily conform with a fluorine-free substrate and can form a film of the PFPE derivative on a substrate surface so that the derivative can be fixed to the substrate by the curing (for example, polymerization) after the film formation. Because the PFPE derivative has the affinity with the fluorine-free material, it is not necessary to use a fluorine-containing solvent such as a fluorinated hydrocarbon which is expensive and the possibility of environmental depletion such as ozone layer depletion and global warming. The composition of the present invention has a carbon-carbon double bond and thus has the addition polymerizability.

The present invention provides a composition containing a carbon-carbon double bond, which comprises:
(A) a triisocyanate prepared by trimerizing a diisocyanate, and
(B) a combination of at least two active hydrogen-containing compounds
wherein the component (B) comprises:

(B-1) a perfluoropolyether having at least one active hydrogen, and
(B-2) a monomer having an active hydrogen atom and a carbon-carbon double bond.

DETAILED EXPLANATION OF THE INVENTION

In the present invention, the reaction of the triisocyanate (A) with the component (B), that is, the reaction of an NCO group present in the triisocyanate (A) with an active hydrogen atom present in the component (B) gives a perfluoropolyether-containing compound having at least one carbon-carbon double bond. The composition of the present invention preferably comprises a perfluoropolyether-containing compound having at least one carbon-carbon double bond. The equivalent ratio of the NCO group present in the triisocyanate (A) to the active hydrogen atom present in the component (B) may be 1:at least 1, particularly 1:1.

For example, the reaction of the NCO group present in the triisocyanate (A) with the active hydrogen atom present in the components (B-1) and (B-2) can give a perfluoropolyether-containing compound having at least one carbon-carbon double bond. The components (B-1) and (B-2) may be simultaneously added to the triisocyanate (A), or the components (B-1) and (B-2) may be sequentially added to the triisocyanate (A). The total amount of the active hydrogen possessed by the component (B-1) and the active hydrogen possessed by the component (B-2) may be 3 mol, relative to 1 mol of the triisocyanate (A). The amount of the component (B-1) may have a lower limit of 0.0001 mol, for example, 0.01 mol, particularly 0.1 mol, and an upper limit of 2 mol, for example, 1.5 mol, particularly 1.0 mol, based on 1 mol of the triisocyanate (A). The amount of component (B-1) may be, for example, from 0.0001 to 2 mol, particularly from 0.01 to 1.2 mol, based on 1 mol of the triisocyanate (A). The amount of the component (B-2) may have a lower limit of 1 mol, for example, 1.2 mol, particularly 1.5 mol, and an upper limit of 2.5, for example, 2.0 mol, particularly 1.8 mol, based on 1 mol of the triisocyanate (A). The amount of the component (B-2) may be, for example, from 1.0 to 2.5 mol, particularly from 1.2 to 2.0 mol, based on 1 mol of the triisocyanate (A).

The component (B) may further contain (B-3) a compound having an active hydrogen atom. The perfluoropolyether-containing compound having at least one carbon-carbon double bond can be obtained by reacting the component (A) with the components (B-1), (B-2) and (B-3). The components (B-1), (B-2) and (B-3) may be simultaneously added to the triisocyanate (A), or the components (B-1), (B-2) and (B-3) may be sequentially (the addition order is not limited to the description order.) added to the triisocyanate (A).

Preferably, at least 1 mol of the component (B-2) is reacted with the isocyanate group present in the triisocyanate (A), and the remaining NCO group is reacted with the component (B-1) and the component (B-3). The total amount of the active hydrogen possessed by the component (B-1), (B-2) and (B-3) is preferably at least 3 mol, particularly 3 mol, relative to 1 mol of the triisocyanate (A).

In the present invention, the perfluoropolyether having carbon-carbon double bond and raw materials for obtaining the perfluoropolyether having carbon-carbon double bond (that is, the components (A) and (B)) can be homogeneously dispersed in a diluent (for example, a solvent and an acrylic monomer).

The triisocyanate (A) is a triisocyanate prepared by trimerizing a diisocyanate. Examples of diisocyanate used for giving the triisocyanate (A) include diisocyanates having aliphatically bonded isocyanate groups, for example, hexamethylene diisocyanate, isophorone diisocyanate, xylylene diisocyanate, hydrogenated xylylene diisocyanate and dicyclohexylmethane diisocyanate; and diisocyanates having aromatically bonded isocyanate groups, for example, tolylene diisocyanate, diphenylmethane diisocyanate, polymethylenepolyphenyl polyisocyanate, tolidine diisocyanate and naphthalene diisocyanate.

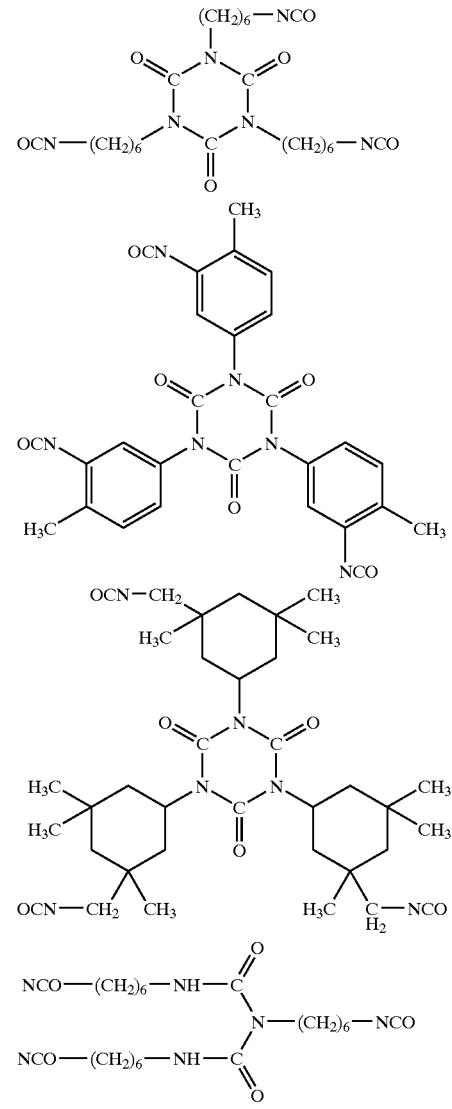

The component (B) comprises:
(B-1) a perfluoropolyether having at least one active hydrogen atom (for example, an active hydroxyl group),
(B-2) a monomer having an active hydrogen atom and a carbon-carbon double bond, and
(B-3) optionally present, a compound having an active hydrogen atom (for example, an active hydroxyl group). The active hydrogen atom is present in an active hydrogen-containing group such as an active hydroxyl group.

The perfluoropolyether (B-1) is a compound having one hydroxyl group at one molecular end or one hydroxyl group at each of both ends, in addition to a perfluoropolyether group.

The perfluoropolyether (B-1) is preferably a compound of the general formula:

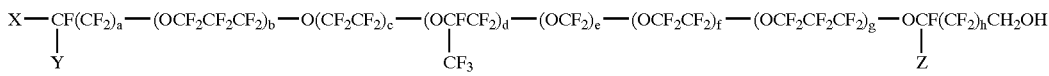

wherein X is a fluorine atom or a —CH$_2$OH group,
Y and Z are a fluorine atom or a trifluoromethyl group,
a is an integer of 1 to 16, c is an integer of 0 to 5, b, d, e, f and g are an integer of 0 to 200,
and h is an integer of 0 to 16.

The monomer (B-2) having active hydrogen and carbon-carbon double bond is preferably a (meth)acrylate ester or vinyl monomer-having active hydrogen, particularly a hydroxyl group. Examples of the monomer (B-2) include the following:
hydroxyethyl (meth)acrylate,
aminoethyl (meth)acrylate
HO(CH$_2$CH$_2$O)$_i$—COC(R)C═CH$_2$ (R:H, CH$_3$, i=2 to 10),
CH$_3$CH(OH)CH$_2$OCOC(R)C═CH$_2$ [R:H, CH$_3$; 2-hydroxypropyl (meth)acrylate]
CH$_3$CH$_2$CH(OH)CH$_2$OCOC(R)C═CH$_2$ [R:H, CH$_3$; 2-hydroxybutyl (meth)acrylate]
C$_6$H$_5$OCH$_2$CH(OH)CH$_2$OCOC(R)C═CH$_2$ [R:H, CH$_3$; 2-hydroxy-3-phenoxypropyl (meth)acrylate]
allyl alcohol,
HO(CH$_2$)$_k$ CH═CH$_2$ (k=2 to 20),
(CH$_3$)$_3$SiCH(OH)CH═CH$_2$, and
styryl phenol.

The compound (B-3) having active hydrogen is preferably a compound which has neither a perfluoropolyether group nor a carbon-carbon double bond and which has at least one active hydrogen. Preferable examples of the compound (B-3) include the following:
a monohydric alcohol comprising a linear or branched hydrocarbon having 1 to 16 carbon atoms,

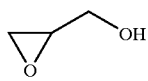

a secondary amine comprising a linear or branched hydrocarbon having 1 to 16 carbon atoms,
a secondary amine containing an aromatic group,
an Rf alcohol; Q(CF$_2$)$_l$(CH═CH)$_m$(CHI)$_n$(CH$_2$)$_o$OH (wherein Q is a hydrogen atom, a fluorine atom or a (CF$_3$)$_2$CF— group, l is an integer of 1 to 10, m and n is an integer of 0 to 1, and o is an integer of 1 to 10),
a polyalkylene glycol monoester; for example, R(OCH$_2$CH$_2$)$_p$OH, R(OCH$_2$CH$_2$CH$_2$)$_q$OH (R is a linear or branched hydrocarbon, an acetyl group, or an alkylphenoxy group having 1 to 16 carbon atoms, and p and q are an integer of 1 to 20),
an aromatic alcohol,
a silane compound having active hydrogen,
(CH$_3$)$_3$ Si(CH$_2$)$_s$OH (wherein s is an integer of 1 to 20),
[(CH$_3$)$_3$]$_2$NH,

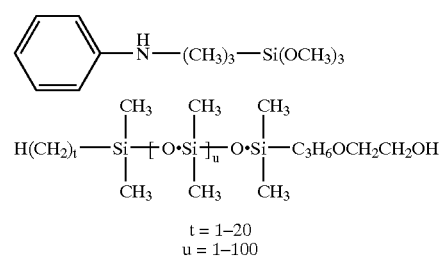

t = 1–20
u = 1–100

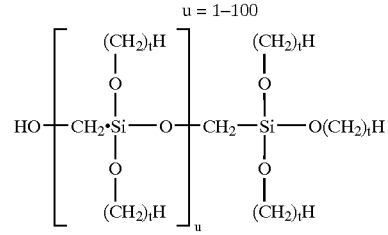

t = 1–6
u = 1–10

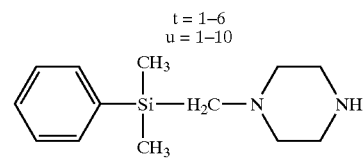

The reaction for giving the perfluoropolyether-containing compound having carbon-carbon double bond may be as follows:

HMDI - isocyanurate type triisocyanate

Hydroxyethyl acrylate (HEA)

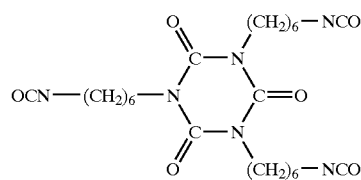
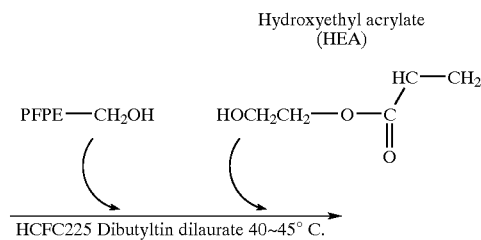

HCFC225 Dibutyltin dilaurate 40~45° C.

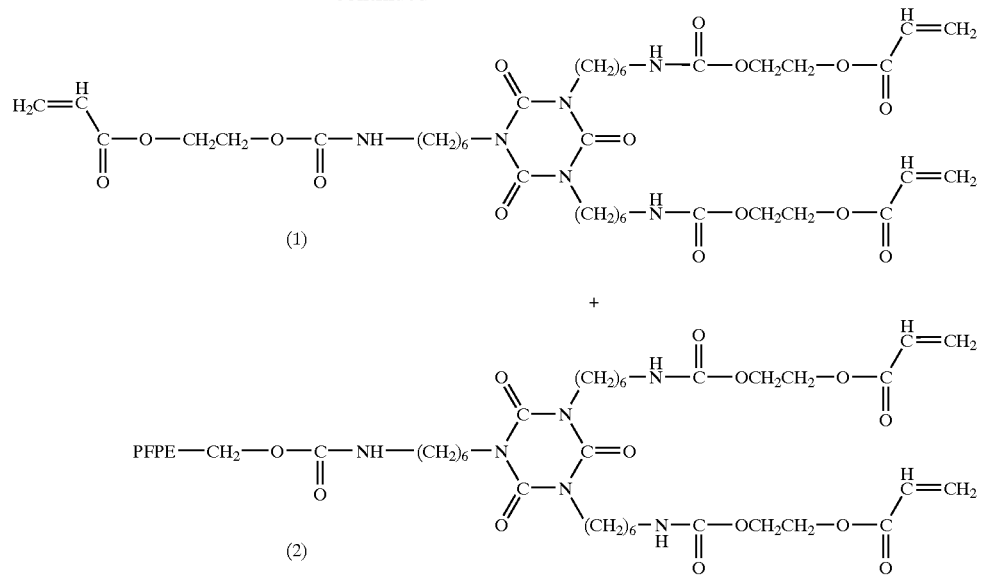

(1)

+

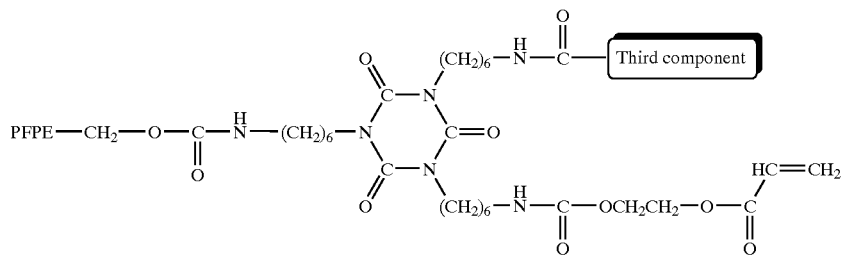

(2)

Isocyanurate type PFPE urethane acrylate

Specific examples of the perfluoropolyether-containing compound having carbon-carbon double bond obtained by using the third component (that is, the component (B-3)) include a compound of the following chemical formula:

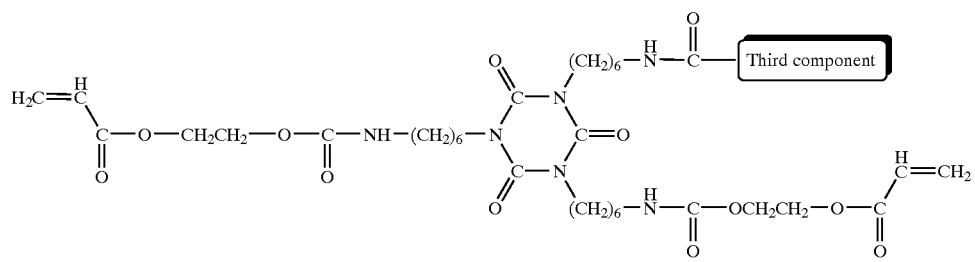

The perfluoropolyether-containing compound having carbon-carbon double bond may be the compound of the above formula, wherein a first isocyanate group projecting from an isocyanurate ring reacts with the component (B-1), a second isocyanate group reacts with the component (B-2), and a third isocyanate group reacts with the component (B-3).

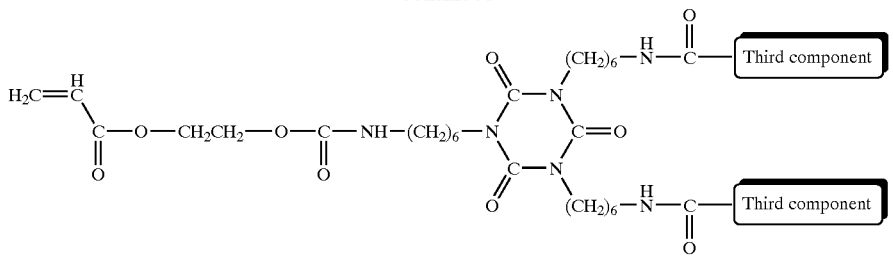

Preferably, in the perfluoropolyether-containing compound having carbon-carbon double bond, each isocyanate group projecting from the isocyanurate ring reacts with only one molecule of each of the components (B-1), (B-2) and (B-3), and the reacted components (B-1), (B-2) and (B-3) make no reaction with any other compound to form an end.

The perfluoropolyether-containing compound having carbon-carbon double bond is a compound having at least one molecule of the component (B-2) bonded to one isocyanate group. The remaining two isocyanate groups may react with and bond to any of the components (B-1), (B-2) and (B-3).

The perfluoropolyether-containing compound can be a mixture wherein different type of the components (B-1), (B-2) and (B-3) bond to the remaining two isocyanate groups.

A mixture of the perfluoropolyether-containing compounds can contain:
a perfluoropolyether-containing compound molecule which does not bond to the component (B-1),
a perfluoropolyether-containing compound molecule which bonds to one molecule of the component (B-1), and/or
a perfluoropolyether-containing compound molecule which bond to two molecules of the component (B-1). In the mixture of the perfluoropolyether-containing compounds, the amount of the perfluoropolyether-containing compound bonding to one molecule of the component (B-1) may have a lower limit of 0.0001 mol, for example, 0.01 mol, particularly 0.1 mol, based on 1 mol of the total perfluoropolyether-containing compounds. The mixture of the perfluoropolyether-containing compounds may contain a perfluoropolyether-containing compound bonded to 2 molecules of the component (B-1), the amount of which has an upper limit of 1 mol, for example, 0.8 mol, particularly 0.5 mol, based on 1 mol of the total perfluoropolyether-containing compounds. The mixture of the perfluoropolyether-containing compound may not contain the perfluoropolyether-containing compound bonding to 2 molecules of the component (B-1).

The mixture of the perfluoropolyether-containing compounds may contain
a perfluoropolyether-containing compound molecule not bonded to the component (B-3),
a perfluoropolyether-containing compound molecule bonded to one molecule of the component (B-3), and/or
a perfluoropolyether-containing compound molecule bonded to two molecules of the component (B-3). The amount of the perfluoropolyether-containing compound molecule bonded to one molecule of the component (B-3) has an upper limit of 1 mol, for example, 0.8 mol, particularly 0.5 mol, based on 1 mol of the total perfluoropolyether-containing compounds. The mixture of the perfluoropolyether-containing compounds may contain the perfluoropolyether-containing compound bonded to 2 molecules of the component (B-3), the amount of which has an upper limit of 0.8 mol, for example, 0.5 mol, particularly 0.3 mol, based on 1 mol of the total perfluoropolyether-containing compounds.

The affinity with the fluorine-free substance can be imparted to the perfluoropolyether by reacting (A) a triisocyanate (for example, a HMDI-isocyanurate modified trimer) which is a trimer of a diisocyanate having the high affinity with various fluorine-free substances (for example, alkyl diisocyanate) with (B-1) a perfluoropolyether having active hydrogen at end, (B-2) and addition-polymerizable monomer having active hydrogen, and optionally (B-3) a third compound having active hydrogen.

When the active hydrogen of the monomer (B-2)/the active hydrogen of the PFPE (B-1)/the isocyanate group of the triisocyanate (A) are reacted in a ratio of 2/1/3 (equivalent) in the same reactor, single substance of the compound (2) can be obtained. The compound (2) has the high affinity with a diluent, particularly a fluorine-free diluent.

When the reactant charge ratio is adjusted so that all NCO groups of the triisocyanate are modified in the ratio of active hydrogen of monomer (B-2)/active hydrogen of PFPE (B-1) $\geq 2$ (equivalent ratio), a mixture of a plurality of the components containing the fluorine-free compound (1) and the PFPE-containing fluorocompound (2) is produced in the same reactor. This mixture is addition polymerizable composition having the increased homogeneity. Because the fluorine-free compound (1) has no fluorine atom and a structure analogous to the compound (2), the fluorine-free compound (1) has a role of solubilizing the fluorocompound (2) in a fluorine-free coating agent and a role of a polyfunctional acrylate crosslinking agent.

According to the present invention,
(a) it is possible to provide a PFPE-containing treatment agent having the compatibility significantly increased by the addition of a urethane acrylate structure having an isocyanurate skeleton,
(b) it possible to easily prepare a mixture of the compound (1) and the compound (2) by controlling a composition ratio of active hydrogen-containing compounds reacted with a triisocyanate in one pot, and
(c) it is possible to significantly improve the solubility into a fluorine-free compound by making a mixture.

While a composition containing the component (2) and free of the component (1) has the solubility to some degree, a mixture of the component (2) and the component (1) further improves the solubility.

Thus, for example, the single product of the component (2) can be dispersed in several types of monofunctional dilutable acrylate and can be homogeneously dispersed in a polyfunctional acrylate having high crosslinkability, which is used in a hard coating agent, in the copresence of a dilutable monomer, and then a homogeneous film can be made.

The mixture of the compound (1) and the compound (2) obtained by adjusting the charge ratio and using one pot is compatible with a fluorine-free polyfunctional acrylate and can be incorporated into a mixture solution consisting of highly crosslinkable polyfunctional acrylate (without a dilutable acrylate).

Because the compounds used in the present invention have the carbon-carbon double bond, they are copolymerized with a coating monomer by means of heat- or photo-polymerization and firmly fixed into a surface coating film.

Because some degree of hardness is required for the use as a surface protection film, it is preferable to use, as the main component, a polyfunctional monomer having the high crosslinking density in order to increase the hardness. For this purpose, the perfluoropolyether-containing compound having carbon-carbon double bond is preferably compatible with the polyfunctional monomer.

The above modification enables the perfluoropolyether (PFPE) to mix with an addition-polymerizable monomer composition such as an acrylic monomer constituting, for example, a (hard) coating agent. The coating agent having the surface property of PFPE, which can be used on various substrates such as a resin, a metal and glass, can be obtained. While the coating agent of the present invention can be used for forming a hard film, it can form a soft film depending on a monomer copolymerized.

Because of use of the reaction of the NCO group and the hydroxyl group in the present invention, the PFPE having the hydroxyl group and the acrylate having the hydroxyl group sequentially or a mixture thereof are reacted with HMDI-isocyanurate modified product (triiscyanate) so that the synthesis can be done without the necessity of removing the products form the reactor. That is, the one pot synthesis can be done.

The composition ratio of the component (1) to the component (2) can be varied and the solubility into a hydrocarbon material and the content of the PFPE can be controlled by adjusting the ratio of HEA (hydroxyl group-containing acrylate)/hydroxyl group-containing PFPE with respect to the HEA and the hydroxyl group-containing PFPE which are reacted in the total amount of 3 mol based on 1 mol of the triisocyanate. Additionally, the objective compound can be produced in one pot. For example, when HEA/PFPE is 2/1 (molar ratio), the compound (2) in the above formulas can be obtained in 100%, and when HEA/PFPE is 8/1 (molar ratio), the compound (1)/the compound (2) in 2/1(molar ratio) can be obtained.

An advantage of the one pot synthesis is good productivity. The polymerizable compound can be handled till the final product with small heat history and without the undesirable polymerization on half way.

The present invention produces the composition having more intimate mixing than a composition prepared by the post-mixing (that is, the compound (1) and the compound (2) are prepared separately and then mixed). Thus, the composition of the present invention can be more compatible with another coating monomer.

The ingredients in the composition can be arbitrarily changed according to the solubility and the target properties of the polymer film and can be compatibilized with various objective coating agents. For example, by adjusting the molecular weight of the PFPE compound to e.g., 500 to 10000, the compatibility can be increased. Even if a coating agent having poor solubility is used, the composition of the present invention can be compatibilized with the coating agent. In order to improve the compatibility, the equivalent ratio (that is, the equivalent ratio relating to active hydrogen) of the component (B-2)/the component (B-1) (for example, HEA/PFPE) is increased to preferably at least 2/1, for example, from 2/1 to 20,000/1.

The compound of the present invention is a compound wherein at least one NCO group among three NCO groups present in one molecule is bonded to the carbon-carbon double bond. Accordingly, the amount of the component (B-2) (for example, an active hydrogen-containing acrylate) reacted with one molecule of the triisocyanate (A) is at least one mol. The component (B-1) (for example, a PFPE-containing alcohol) and the third component (for example, the component (B-3)) are bonded to the remaining NCO group.

The compound of the present invention may be a compound wherein the PFPE-containing alcohol (B-1) has reacted with at least one NCO group among three NCO groups in 1 mol of the triisocyanate, the component (B-2) (for example, a hydroxyl group-containing acrylate) has reacted in the amount of at least 1 mol and the remaining reactant is a third functional component (for example, a long chain alkyl-containing alcohol for the purpose of imparting the solubility and a silicone compound for the purpose of increasing the hardness).

The perfluoropolyether-containing compound having carbon-carbon double bond of the present invention (that is, the PFPE-containing monomer) may have one or two hydroxyl groups. When two hydroxyl groups are possessed, the perfluoropolyether-containing compound has one hydroxyl group at each end of the perfluoropolyether compound molecule.

When the component (B-1) is a monool, the preparation of the PFPE monomer can be conducted by adding the raw materials containing the component (B-1), (B-2) and (B-3) in sequence or in the form of a mixture in the same reactor to react with the triisocyanate. When the component (B-1) is a diol, the preparation of the PFPE monomer is preferably conducted by a sequential reaction wherein 2 mol of a mixture of the monomer (B-2) having active hydrogen and carbon-carbon double bond and the component (B-3) having active hydrogen (that is, the third component) is firstly reacted with 1 mol of triisocyanate, and then 1 mol of the remaining NCO moiety is reacted with 0.5 mol of PFPE both-terminated diol (that is, the component (B-1) of diol type).

The compound having carbon-carbon double bond and perfluoropolyether group can be purified by precipitating the composition of the present invention in a nonpolar solvent (for example, an aliphatic or aromatic hydrocarbon having 4 to 20 carbon atoms) to separate from a high boiling point reaction solvent, then adding acetone and a polymerization inhibitor, and removing a solution of the compound having carbon-carbon double bond and perfluoropolyether group from the reactor.

The composition of the present invention, particularly the composition comprising the perfluoropolyether-containing compound having carbon-carbon double bond (that is, the PFPE monomer) can be compatibilized with a diluent (particularly, various solvents and various polymerizable coating monomers (that is, monomers having carbon-carbon double bond)) in a high concentration so that the film formation is easy and the homopolymerization of the PFPE monomer or the copolymerization of the PFPE monomer and the polymerizable coating monomer can be conducted after the film formation. The diluent is generally a fluorine-free compound and may be a fluorocompound.

The solvent and/or polymerizable coating monomer (the monomer having carbon-carbon double bond) is optionally added to the composition of the present invention before the composition of the present invention is coated on the substrate.

The solvent is a fluorine-free solvent (particularly, a hydrocarbon-based solvent) or a fluorosolvent. Examples of the fluorine-free solvent include ketones (for example, methyl ethyl ketone and acetone); alcohols (for example, a monovalent alcohol such as ethanol and propanol, and polyhydric alcohol (particularly, di- to tetra-hydric alcohol) such as ethylene glycol, diethylene glycol and propylene glycol); esters (for example, ethyl acetate); and ethers (for example, diethylene glycol monomethyl ether, diethylene glycol monomethyl ether acetate). Examples of the fluorosolvent include fluoroalcohols, fluoroethers, and ditrifluoromethyl benzene.

Examples of the fluoroalcohol include:

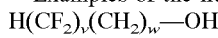
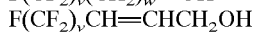
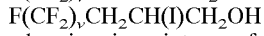

wherein v is an integer of 1 to 8, and w is an integer of 1 to 8.

The fluoroether may be a compound of the formula: $R^{21}$—O—$R^{22}$ wherein $R^{21}$ and $R^{22}$ are a linear of branched alkyl group having 1 to 10 carbon atoms which may contain or may not contain fluorine, and at least one of $R^{21}$ and $R^{22}$ contains a fluorine atom.

Examples of the fluoroether include hydrofluoroalkyl ethers. The commercial products of the fluoroether include HFE-7100 and HFE-7200 manufactured by 3M Company.

Ditrifluoromethyl benzene includes a single product or mixture of o-, m- and p-isomers.

The polymerizable coating monomer is a compound having at least one carbon-carbon double bond. The polymerizable coating monomer may be, for example, acrylate monomers such as (meth)acrylate ester; vinyl alcohols, vinyl monomers such as vinyl acetate and vinyl ethers (for example, $C_{1-12}$ alkyl vinyl ether). The polymerizable coating monomer may be a (meth)acrylate ester, for example, (meth) acrylate esters having at least one hydroxyl group. The (meth)acrylate ester may be, for example, a compound prepared by esterification between a di- to penta-hydric alcohol (for example, diols such as $C_2$-$C_{10}$ alkylenediol) and (meth)acrylic acid.

The polymerizable coating monomer is a fluorocompound or a fluorine-free compound. The polymerizable coating monomer is a silicon-containing compound or a silicon-free compound.

The polymerizable coating monomer may be a monofunctional monomer having one carbon-carbon double bond, or a polyfunctional monomer having at least 2 carbon-carbon double bonds.

The polymerizable coating monomer may be the monofunctional monomer. Examples of the monofunctional monomer include acrylamide, 7-amino-3,7-dimethyloctyl (meth)acrylate, isobutoxymethyl(meth)acrylamide, isobornyloxyethyl (meth)acrylate, isobornyl (meth)acrylate, 2-ethylhexyl (meth)acrylate, ethyl diethyleneglycol (meth) acrylate, t-octyl(meth)acrylamide, (meth) acryloylmorpholine, diacetone(meth)acrylamide, N,N-dimethylaminoethyl (meth)acrylate, N,N-diethyl aminoethyl (meth)acrylate, lauryl (meth)acrylate, dicyclopentdiene (meth)acrylate, dicyclopentenyloxyethyl (meth) acrylate, dicyclopentenyl (meth)acrylate, N,N-dimethyl (meth)acrylamide, tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth) acrylate, 2-hydroxybutyl (meth)acrylate, phenoxyethyl (meth)acrylate, butoxyethyl (meth)acrylate, pentachlorophenyl (meth)acrylate, pentabromophenyl (meth)acrylate, polyethyleneglycol mono(meth)acrylate, polypropyleneglycol mono(meth)acrylate, bornyl (meth)acrylate, methyltriethylenediglycol (meth)acrylate, 1,4-butanediol mono (meth)acrylate, 2-ethyl hexylpolyoxy (meth)acrylate, benzyl (meth)acrylate, phenyloxyethyl (meth)acrylate, phenyloxyethyl oxyethyl (meth)acrylate, tricyclodecane mono(meth) acrylate, acryloylmorpholine, N-vinylcaprolactam, 2-hydroxy-3-phenyloxypropyl (meth)acrylate, 3-hydroxy-3-phenoxypropyl acrylate, 2-methacryloyloxyethyl succinate, 2-methacryloyloxyethyl hexahydrophthalate, ethoxydiethyleneglycol acrylate, methoxytriethyleneglycol acrylate, 2-methacryloyloxyethyl-2-hydroxyethyl phthalate, and (meth)acryloyl group-containing monomers such as compounds of the following formulas (i) to (iii):

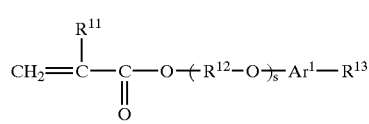

wherein $R^{11}$ is a hydrogen atom or a methyl group, $R^{12}$ is an alkylene group having 2 to 6, preferably 2 to 4 carbon atoms, $R^{13}$ is a hydrogen atom or an alkyl group having 1 to 12, preferably 1 to 9 carbon atoms, $Ar^1$ is a divalent aromatic group such as a phenylene group, a biphenylene group and a naphtylene group, s is the number of 0 to 12, preferably 1 to 8,

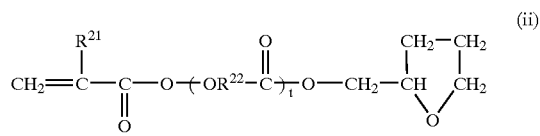

wherein $R^{21}$ is a hydrogen atom or a methyl group, $R^{22}$ is an alkylene group having 2 to 8, preferably 2 to 5 carbon atoms, t is the number of 1 to 8, preferably 1 to 4,

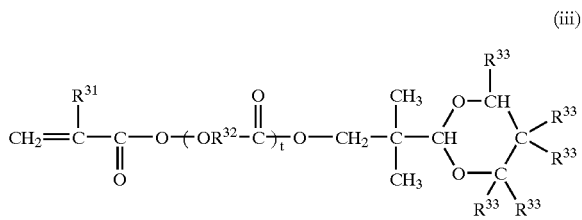

wherein $R^{31}$ is a hydrogen atom or a methyl group, $R^{32}$ is an alkylene group having 2 to 8, preferably 2 to 5 carbon atoms, $R^{33}$ is a hydrogen atom or a methyl group, t is the number of 1 to 8, preferably 1 to 4, provided that each $R^{33}$ may be the same or different.

Examples of a monofunctional monomer containing fluorine atom include trifluoroethyl methacrylate, 2,2,3,4,4,4-hexafluorobutyl methacrylate, perfluorooctylbutyl methacrylate and 2,2,3,3-tetrafluoropropyl methacrylate.

Examples of a monofunctional monomer containing silicon atom include a terminal-reactive polydimethylsiloxane having the formula (iv):

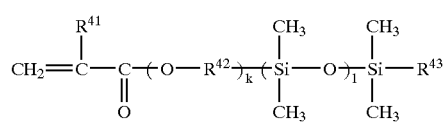
(iv)

wherein $R^{41}$ is a hydrogen atom or a methyl group, $R^{42}$ is a branched or linear alkylene group having 1 to 10 carbon atoms, $R^{43}$ is a branched or linear alkyl group having 1 to 10 carbon atoms, k is from 1 to 10, and l is from 1 to 200.

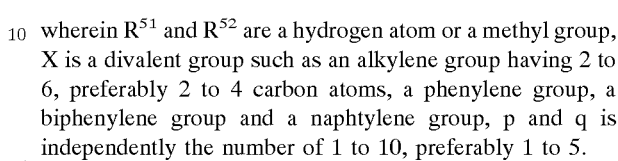
(v)

wherein $R^{51}$ and $R^{52}$ are a hydrogen atom or a methyl group, X is a divalent group such as an alkylene group having 2 to 6, preferably 2 to 4 carbon atoms, a phenylene group, a biphenylene group and a naphtylene group, p and q is independently the number of 1 to 10, preferably 1 to 5.

A specific example of the polyfunctional monomer free of fluorine atom and silicon atom is an acrylate ester of bisphenol A diglycidyl ether polymer of the formula (vi):

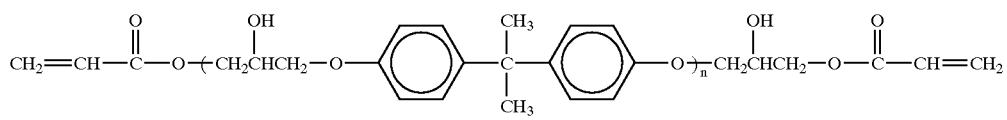
(vi)

wherein n is the number of 1 to 3.

Specific examples of the polyfunctional monomer having silicon atom include a dimethylsiloxane compound of the formula (vii):

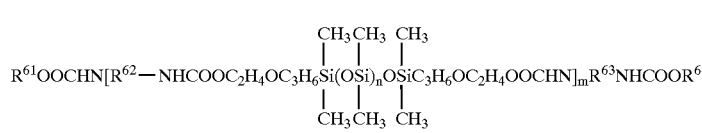
(vii)

The polymerizable coating monomer may be the polyfunctional monomer. Examples of the polyfunctional monomer include (meth)acryloyl group-containing monomers such as ethyleneglycol di(meth)acrylate, dicyclopentenyl di(meth)acrylate, triethyleneglycol diacrylate, tetraethyleneglycol di(meth)acrylate, polyethyleneglycol diacrylate, tricyclodecanediyldimethylene di(meth)acrylate, trimethylolpropane di(meth)acrylate, trimethylolpropane tri(meth)acrylate, EO-modified trimethylolpropane tri(meth)acrylate, PO-modified trimethylolpropane tri(meth)acrylate, tripropyleneglycol di(meth)acrylate, neopentylglycol di(meth)acrylate, 1,4-butanediol di(meth)acrylate, 1,6-hexanediol di(meth)acrylate, pentaerythritol tri(meth)acrylate, polyester di(meth)acrylate, polyethyleneglycol di(meth)acrylate, tris[(meth)acryloxyethyl]isocyanurate, tricyclodecanedimethylol di(meth)acrylate, trimethylolpropane tripropoxylated tri(meth)acrylate, glyceroltripropoxylated tri(meth)acrylate, hydroxypivalic acid neopentyl glycol di(meth)acrylate, bisphenol A polyethoxylated di(meth)acrylate, pentaerythritol tri- or tetra(meth)acrylate, dipentaerythritol penta- and hexa(meth)acrylate, ditrimethylolpropane tetra(meth)acrylate, polyester (meth)acrylate, 1,10-decanediol dimethacrylate, hydroxypivalic acid neopentylglycol diacrylate, ethyleneoxide-modified trimethylolpropane triacrylate, dimethyloltricyclodecane diacrylate, and a compound of the following formula (v):

wherein m is the number of 1 to 10, n is the number of 6 to 36, $R^{61}$ and $R^{64}$ are a group having at least two acrylate groups ($CH_2$=CHCOO—), and $R^{62}$ and $R^{63}$ are a divalent organic group.

In the formula, $R^{61}$ and $R^{64}$ may be

or

$R^{62}$ and $R^{63}$ may be

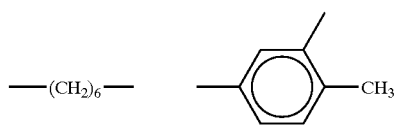

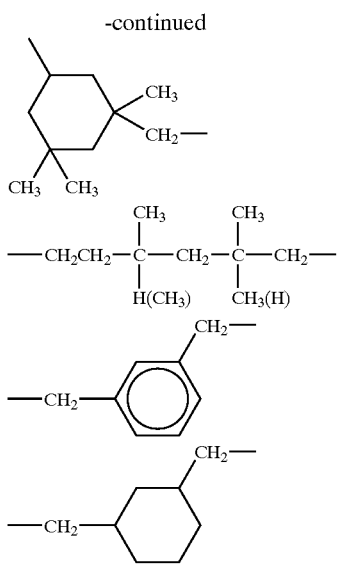

The polymerizable coating monomer may be an epoxy (meth)acrylate or urethane (meth)acrylate. The epoxy (meth)acrylate or urethane (meth)acrylate has one or at least 2 acryl groups.

The epoxy (meth)acrylate is a reaction product between an epoxy resin and a (meth)acrylate. The epoxy resin used herein includes, for example, a bisphenol A type epoxy resin, a bisphenol F type epoxy resin, a biphenyldiglycidyl ether, a phenol novolac type epoxy resin, a cresol novolac type epoxy resin, a trisphenol methane type epoxy resin, an epoxidized product of aliphatic or cycloaliphatic olefin, epoxidized polybutadiene, and epoxidized rosin.

The urethane (meth)acrylate may be, for example, a reaction product of a polyol compound (a), an organic polyisocyanate (b) and a hydroxyl group-containing (meth) acrylate (c).

Examples of the polyol compound (a) generating the urethane (meth)acrylate include diols such as ethylene glycol, propylene glycol, neopentylglycol, 1,6-hexane diol, 3-methyl-1,5-pentane diol, 1,9-nonanediol, 1,4-butanediol, diethyleneglycol, tripropyleneglycol, 1,4-dimethylolbenzene, 1,4-dimethylolcyclohexane, bisphenol A polyethoxydiol, polypropyleneglycol and polytetramethyleneglycol; polyester polyols which are reaction products between these diols and dihydric acids such as succinic acid, maleic acid, itaconic acid, phthalic acid, isophthalic acid, terephthalic acid, adipic acid and dimeric acid or acid anhydrides thereof; polycaprolactone polyols which are reaction products of the above diols, the above dihydric acids or acid anhydrides thereof, and ε-caprolactone; and polycarbonate polyols.

Examples of the organic polyisocyanate (b) generating the urethane (meth)acrylate include, for example, trylene diisocyanate, isophorone diisocyanate, xylylene diisocyanate, diphenylmethane-4,4'-diisocyanate, dicyclopentanyl diisocyanate, hexamethylene diisocyanate, 2,4,4'-trimethylhexamethylene diisocyanate, and 2,2',4-trimethylhexamethylene diisocyanate.

Examples of the hydroxyl group-containing (meth) acrylate (c) generating the urethane (meth)acrylate include, for example, a reaction product of ε-caprolactone and 2-hydroxyethyl (meth)acrylate, 2-hydroxypropyl (meth) acrylate, 1,4-butanediol mono(meth)acrylate or 2-hydroxyethyl (meth)acrylate; and 2-hydroxy-3-phenyloxypropyl (meth)acrylate, pentaerythritol tri(meth) acrylate and glycerol di(meth)acrylate.

The composition compatible with various mediums can be obtained by adjusting the ingredients to decrease the content of the hydroxyl group-containing PFPE compound and to reacting the active hydrogen-containing compound (B-3) according to the objective. Thus, examples are not limited to the solvents and/or polymerizable coating monomers which are mentioned herein.

A weight ratio of the composition of the present invention (particularly, the perfluoropolyether-containing compound having carbon-carbon double bond (that is, the PFPE monomer)) to the diluent may be from 1:100,000 to 1:1, for example from 1:10,000 to 1:1, particularly from 1:100 to 1:1.

The composition of the present invention is useful as a surface treatment agent. Examples of a substrate to be treated include a resin (particularly, a fluorine-free resin), a metal, and glass. The composition of the present invention, particularly the PFPE monomer may be coated on the substrate surface before the polymerization, or may be coated on the substrate surface after the polymerization. The polymer containing the perfluoropolyether can be obtained by polymerizing the composition of the present invention. The polymer may be one prepared by polymerizing the carbon-carbon double bond-containing composition of the present invention and the monomer having carbon-carbon double bond.

The composition of the present invention can be used as a coating liquid. The coating liquid may contain (1) a carbon-carbon double bond-containing composition or a polymer, and (2) a fluoroalcohol, a fluoroether or ditrifluoromethylbenzene. An article having a perfluoropolyether film on its surface can be obtained by coating the composition of the present invention on the surface of the article and then polymerizing the composition.

The present invention can be widely used for an article (particularly, an optical material) requiring the surface soil releasability and the swellability. Examples of the article include a front protection panel of a display of PDP, LCD and the like, antireflection panel, a polarized light plate, an antiglare plate, an instrument such as a cellular phone and a PDA, a touch panel sheet, a optical disc such as a DVD disc, a CD-R, and an MO, a glass lens and an optical fiber.

The optical material such as optical disc is preferably surface coated with a film which is formed by adding the carbon-carbon double bond-containing composition or the polymer comprising the carbon-carbon double bond-containing composition so that the perfluoropolyether (PFPE) content in the carbon-carbon double bond-containing composition or the polymer comprising the carbon-carbon double bond-containing composition is from 0.01% by weight to 10% by weight based on the film. When the amount is from 0.01% by weight to 10% by weight, the characteristic properties (such as soil releasability) of the PFPE addition are exhibited, the surface hardness is high, and transmittance is high.

Embodiments of the Invention

Examples and Comparative Examples are shown and the present invention is illustrated.

EXAMPLE 1

Preparation of 50 wt % Solution of Perfluoropolyether Urethane Acrylate Composition (1) in HCFC-225:

In a 1 L three-necked flask equipped with a dropping funnel, a condenser, a thermometer and a stirrer, SUMIDUR N3300 (a cyclic trimer of hexamethylene diisocyanate, manufactured by Sumitomo Bayer Urethane Co., Ltd., an NCO group content: 21.9%) (57 g) was dissolved in HCFC-225 (165 g), dibutyltin dilaurate (a first grade agent manufactured by Wako Pure Chemical Industries, Ltd.) (0.4 g) was added, a solution of DEMNUM (a PFPE monoalcohol which is identified as the formula: $CF_3CF_2O-(CF_2CF_2CF_2O)_{10.9}-CF_2CF_2CH_2OH$ and purity: 86.9% by $^{19}F$-NMR and 1H-NMR, manufactured by Daikin Industries, Ltd.) (244 g) dissolved in HCFC-225 (160 g) was dropwise added over 4.5 hours in air at room temperature with stirring, and the mixture was stirred for 6 hours. The mixture was warmed to 40 to 45° C., hydroxyethyl acrylate (24.4 g) was dropwise added over 10 minutes and the mixture was stirred for 3 hours. The complete disappearance of an NCO absorption was confirmed by IR (The $^{19}F$-NMR of the product also confirmed the disappearance of $-CF_3-CH_2OH$.). A 50 wt % solution of perfluoropolyether urethane acrylate composition (1) in HCFC-225 was obtained.

EXAMPLE 2
Preparation of 50 wt % Solution of Perfluoropolyether Urethane Acrylate Composition (2) in HCFC-225

In a 2 L three-necked flask equipped with a dropping funnel, a condenser, a thermometer and a stirrer, SUMIDUR N3300 (a cyclic trimer of hexamethylene diisocyanate, manufactured by Sumitomo Bayer Urethane Co., Ltd., an NCO group content: 21.9%) (144 g) was dissolved in HCFC-225 (200 g), dibutyltin dilaurate (a first grade agent manufactured by Wako Pure Chemical Industries, Ltd.) (0.2 g) was added, a solution of DEMNUM (a PFPE monoalcohol which is identified as the formula: $CF_3CF_2O-(CF_2CF_2CF_2O)_{10.9}-CF_2CF_2CH_2OH$ by $^{19}F$-NMR and 1H-NMR, manufactured by Daikin Industries, Ltd.) (202 g) dissolved in HCFC-225 (300 g) was dropwise added over 4.5 hours in air at room temperature with stirring, and the mixture was stirred for 6 hours. The mixture was warmed to 30 to 40° C., hydroxyethyl acrylate (96 g) was dropwise added over 30 minutes and the mixture was stirred for 6 hours. The complete disappearance of an NCO absorption was confirmed by IR ($^{19}F$-NMR of the product also confirmed the disappearance of-$CF_3-CH_2OH$.). A 50 wt % solution of perfluoropolyether urethane acrylate composition (2) in HCFC-225 was obtained.

EXAMPLE 3
Isolation of Perfluoropolyether Urethane Acrylate Composition (2):

In a 1 L three-necked round-bottom flask equipped with a thermometer, a stirrer and a reduced pressure distillation apparatus, hexane (200 g) was added to the 50 wt % solution (400 g) of perfluoropolyether urethane acrylate composition (2) in HCFC-225 prepared in Example 2 and the mixture was kept standing for 12 hours. An upper layer was separated off, the precipitate was dissolved by adding acetone (500 g) and p-tert-butyl catechol (0.5 g) with stirring. This solution was warmed to 30 to 40° C. at reduced pressure for the purpose of distilling off acetone to give a perfluoropolyether urethane acrylate composition (2) (187 g).

COMPARATIVE EXAMPLE 1

In a 1 L three-necked round-bottom flask equipped with a thermometer, a stirrer and a reduced pressure distillation apparatus, the 50 wt % solution (500 g) of perfluoropolyether urethane acrylate composition (2) in HCFC-225 prepared in Example 2 was heated to 60° C. at reduced pressure to distill off HCFC-225. A gel material insoluble in solvents was obtained in the flask.

COMPARATIVE EXAMPLE 2
Perfluoropolyether Urethane Acrylate Composition (3)

In a 1 L three-necked flask equipped with a dropping funnel, a condenser, a thermometer and a stirrer, dibutyltin dilaurate (a first grade agent manufactured by Wako Pure Chemical Industries, Ltd.) (0.2 g) was added to a solution of DEMNUM (a PFPE monoalcohol which is identified as the formula: $CF_3CF_2O-(CF_2CF_2CF_2O)_{10.9}-CF_2CF_2CH_2OH$ and purity: 86.9% by $^{19}F$-NMR and $^1H$-NMR, manufactured by Daikin Industries, Ltd.) (240 g) in HCFC-225 (240 g) heated at 50 to 60° C. KARENZ MOI (methacryloylhydroxyethyl isocyanate manufactured by Showa Denko K. K.) (19.2 g) was dropwise added for 30 minutes and the mixture was stirred at 50 to 60° C. for 6 hours. The complete disappearance of an NCO absorption was confirmed by IR ($^{19}F$-NMR of the product also confirmed the disappearance of $-CF_3-CH_2OH$.). A 50 wt % solution of perfluoropolyether urethane acrylate composition (3) in HCFC-225 was obtained.

APPLICATION EXAMPLE 1
Comparison of Compatibility of Perfluoropolyether (PFPE) Urethane Acrylate Compositions (1) to (3):

The PFPE urethane acrylate compositions (1) to (3) prepared in Example 1, Example 3 and Comparative Example 2 were added to various solvents and acrylates (manufactured by Kyouei Kagaku Kabushiki Kaisha) so that the PFPE content was 10 wt %, and the mixture was dispersed by stirring or ultrasonic washer. The mixture was kept standing for two weeks and visually observed whether or not the mixture was separated.

The evaluation standard of the compatibility was as follows:

○: The mixture keeps the homogeneous dispersed liquid also after 2 weeks and penetrates a 0.45 μm PTFE membrane filter.

X: The mixture separates into two layers and cannot penetrate a 0.45 μm PTFE membrane filter.

TABLE 1

| Solvent or acrylate | PFPE urethane acrylate composition (1) | PFPE urethane acrylate composition (2) | PFPE urethane acrylate composition (3) |
|---|---|---|---|
| Acetone | X | ○ | X |
| Ethyl acetate | X | ○ | X |
| Diethyleneglycol monomethyl ether | ○ | ○ | X |
| Methylethylketone | X | ○ | X |

TABLE 1-continued

| Solvent or acrylate | PFPE urethane acrylate composition (1) | PFPE urethane acrylate composition (2) | PFPE urethane acrylate composition (3) |
|---|---|---|---|
| HCFC-225 | O | O | O |
| TFP | O | O | X |
| OFP | O | O | X |
| 1.3-Ditrifluoromethylbenzene | O | O | O |
| Diethyleneglycol monomethyl ether acetate | O | O | X |
| 2-Hydroxyethyl acrylate | O | O | X |
| Methoxydiethyleneglycol | O | O | X |
| Nethoxytriethyleneglycol | O | O | X |
| Methoxytetraethyleneglycol | O | O | X |
| tetrahydrofurfuryl acrylate | O | O | X |
| 2-Hydroxypropyl acrylate | O | O | X |
| 2-Hydroxybutyl acrylate | O | O | X |
| 2-Hydroxy-3-phenoxypropyl acrylate | O | O | X |
| Triethyleneglycol diacrylate | X | O | X |
| Acrylate ester (I) of bisphenol A glycidylether polymer | O | O | X |
| Acrylic group-containing polydimethylsiloxane (II) | X | O | X |

TFP: 1H, 1H, 3H-tetrafluoropropanol
OFP: 1H, 1H, 5H-octafluoropentanol
Acrylate ester (I) of bisphenol A glycidylether polymer:

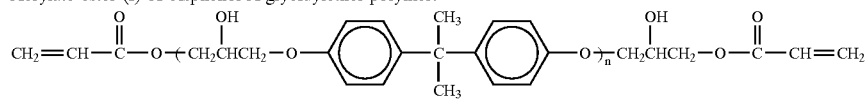

[n = 1]
Acryl group-containing polydimethylsiloxane (II):

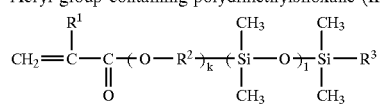

[$R^1$:methyl group, $R^2$:$CH_2CH_2CH_2$, $R^3$:$C_4H_9$, k:1, 1:7 to 10]
(manufactured by AZumax Kabushiki Kaisya: MCR-M11, molecular weight: 800 to 1000)

The compound obtained in Comparative Example 2 corresponds to the PFPE ethyl isocyanate/methacrylate modified product having a hydroxyl group at end disclosed in Examples 5 and 10 of JP-A-10-72568, and was insoluble in various solvents and acrylates.

APPLICATION EXAMPLE 2
Preparation of Acrylic Coating Film Comprising PFPE Urethane Acrylate Composition:
(Non-Solvent Spin Coating on Polycarbonate)

A dispersion was prepared by adding 3 parts by weight of 1-hydroxy-2-methyl-1-phenylpropane to 100 parts by weight of a dispersion liquid prepared by mixing various commercial acrylate mixture solutions with the PFPE urethane acrylate composition so that the dispersion liquid has a desired PFPE part by weight. The dispersion was penetrated through a 0.45 μm PTFE membrane filter and was formed into a thin film on a polycarbonate (5 cm×5 cm, STELLA manufactured by Mitsubishi Plastics Inc.) by a spin coater (6000 rpm). The thin film was UV-cured by a GS mini-conveyer type UV irradiation apparatus ASE-20 (2 kW) in 2.0 J/cm$^2$.

A contact angle, a dropping angle and a pencil hardness of the cured film were measured. As the comparison, a cured film of a PFPE urethane acrylate composition (1) alone and a commercial UV cure type hard coating agent KCD-805 (manufactured by Nippon Kayaku Co. Ltd.) were also evaluated. The results are shown in Tables 2 to 4.

The static contact angle of water and diiodomethane, and the dropping angle of water were evaluated by a contact angle meter (CA-DT manufactured by Kyowa Kaimen Kagaku Kabushiki Kaisha). The pencil hardness was evaluated according to a pencil hardness test in JIS K5400 by scratching a cured film with a pencil loaded with 1 kg by a pencil hardness meter (manufactured by Yasuda Seiki Seisakusho Co., Ltd.) and taking, as the hardness, the lowest value of the hardness which gives scratch to the cured film.

TABLE 2

|  | Blank |  |  |  |  | Homo-polymerization | Homo-polymerization | KCD-805 |
|---|---|---|---|---|---|---|---|---|
| PFPE urethane acrylate composition | 0 | 6.7 | 3.3 | 1.3 | 0.7 | 100 | 0 | 0 |

TABLE 2-continued

| | Blank | | | | | Homo-polymerization | Homo-polymerization | KCD-805 |
|---|---|---|---|---|---|---|---|---|
| (1) PFPE urethane acrylate composition | 0 | 0 | 0 | 0 | 0 | 0 | 100 | 0.5 |
| (3) 2-Hydroxy ethyl acrylate | 33 | 31 | 32.7 | 32.7 | 33 | 0 | 0 | 33 |
| Triethylene glycol diacrylate | 33 | 31 | 31 | 33 | 33 | 0 | 0 | 33 |
| Dipentaerythritol hexaacrylate | 34 | 31.3 | 33 | 33 | 33.3 | 0 | 0 | 33.5 |
| PFPE content (wt %) | 0 | 5 | 2.5 | 1.0 | 0.5 | 75 | 94 | 0.5 |
| Compatibility | Good | Good | Good | Good | Good | | | Separation |
| Water Static contact angle | 57.3 | 110.1 | 110.0 | 110.3 | 109.3 | 110.4 | Unable of film formation because of repelling from substrate | Unable of homogeneous film formation (not penetrated through filter) | 69.3 |
| Dropping angle | 6.4 | 24.1 | | | 26.0 | | | | 6.0 |
| Diiodomethane Static contact angle | 31.3 | 85.3 | 85.8 | 85.6 | 85.7 | 88.9 | | | 37.6 |
| Pencil hardness | B | B | | | | ≦6 B | | | H |

TABLE 3

| | | | | | | |
|---|---|---|---|---|---|---|
| PFPE urethane acrylate composition (1) | 0.7 | 1.6 | 0 | 2.7 | 1.6 | 1.3 |
| PFPE urethane acrylate composition (2) | 0 | 0 | 2.7 | 0 | 0 | 0 |
| Triethyleneglycol diacrylate | 20 | 0 | 0 | 14 | 38.4 | 48.7 |
| Dipentaerythritol hexaacrylate | 30 | 30 | 30 | 41.3 | 0 | 0 |
| Tris(hydroxyethyl) isocyanurate (Note) | 20 | 40 | 40 | 0 | 60 | 50 |
| 2-Hydroxybutyl acrylate | 29.3 | 28.4 | 28.8 | 0 | 0 | 0 |
| 2-Hydroxy-3-phenoxypropyl acrylate | 0 | 0 | 0 | 42 | 0 | 0 |
| PFPE content (wt %) | 0.5 | 1.2 | 1.2 | 2.0 | 1.2 | 1.0 |
| Compatibility | Good | Good | Good | Good | Separation | Separation |
| Pencil hardness | F | F | F | B | Unable of uniform film formation | |

Note:
FANCRYL F-731A manufactured by Hitachi Chemical Co. Ltd.

TABLE 4

| | | | | | | | | |
|---|---|---|---|---|---|---|---|---|
| PFPE urethane acrylate composition (1) | 0.8 | 0.8 | 0 | 0 | 0 | 0 | 0 | 0 |
| PFPE urethane acrylate composition (2) | 0 | 0 | 1.1 | 1.1 | 0.4 | 11.2 | 2.2 | 4.3 |
| triethyleneglycol diacrylate | 50 | 40 | 40 | 30 | 30 | 30 | 30 | 30 |
| dipentaerythritol hexaacrylate | 49.2 | 59.2 | 58.9 | 58.9 | 69.6 | 58.8 | 67.8 | 66.7 |
| PFPE content (wt %) | 0.6 | 0.6 | 0.5 | 0.5 | 0.2 | 5.0 | 1.0 | 2.0 |
| Compatibility | Separation | Separation | Good | Good | Good | Good | Good | Good |
| Static contact angle with water | Unable of uniform film formation | | | 109.9 | 110.0 | | | |
| Static contact angle with diiodomethane | | | | 85.5 | 85.4 | | | |
| Pencil hardness | | | F | H | H | F | F | F |

APPLICATION EXAMPLE 3
Preparation of Acryl Coating Film Comprising PFPE Urethane Acrylate Composition
(Dip Coating of TFP Solution on Polycarbonate):

1-Hydroxy-2-methyl-1-phenylpropane in the amount of 3 wt % based on acrylates was added to a dispersion comprising the given acrylates shown in Table 5 and dissolved in TFP to give the total amount of 100 parts by weight, and the solution was filtered. The solution was coated by spin coating (1000 rpm) on a polycarbonate plate substrate (5 cm×5 cm, STELLA manufactured by Mitsubishi Plastics Inc.) and dried, and then irradiated with ultraviolet ray to cure the coating to give the cured film. The UV irradiation was conducted by using a conveyer type UV irradiation apparatus. The irradiation amount necessary for the curing was 2.7 J/cm².

A contact angle, a pencil hardness, an adherence, a KIMWIPE scratch resistance, a wipe-off of felt pen and a solvent resistance of the cured film were measured. The results are shown in Table 5.

A method of measuring the contact angle and the pencil hardness were the same as in Application Example 2.

The adherence was determined by making total 10 lines of cut on the cured film with a separation distance of 1 mm in each of length and breadth, adhering a cellophane tape thereon and conducting a peeling test according to JIS K 5400.

○: No peeling
X: Peeling

The KIMWIPE scratch resistance was determined by rubbing the cured film with non-soaked KIMWIPE S-200 (a wiper for industrial use, manufactured by Crecia Co., Ltd.) and then observing the appearance of the film.

○: No change of appearance
X: Scratched

The wipe-off of oily felt pen was determined by painting an oily ink on a surface of the cured film with an oily felt pen (SAKURA PEN TOUCH), drying the oily ink, wiping the surface with non-soaked KIMWIPE S-200, and then observing the appearance of the surface.

○: Ink can be wiped off so that ink does not remain on surface.
X: Ink cannot be wiped off so that ink remain on surface.

The solvent resistance was determined by rubbing the cured film with KIMWIPE S-200 soaked with solvent and observing the appearance of the film.

○: No change of appearance
X: Change of appearance. Whitening.

TABLE 5

|  |  |  |  |  |  |  |  |
|---|---|---|---|---|---|---|---|
| PFPE urethane acrylate composition (1) | | 0 | 0.3 | 0 | 0 | 0 | 0 |
| PFPE urethane acrylate composition (2) | | 0 | 0 | 0.3 | 1.2 | 1.2 | 0.2 |
| Triethylene glycol diacrylate | | 0 | 0 | 0 | 0 | 2.9 | 3.9 |
| Dipentaerythritol hexaacrylate | | 0 | 0 | 0 | 2.9 | 2.9 | 5.9 |
| Trimethylolpropane triacrylate | | 0 | 0 | 0 | 2.9 | 3 | 0 |
| Hydroxyethyl acrylate | | 0 | 0 | 0 | 3 | 0 | 0 |
| TFP | | 0 | 99.7 | 99.7 | 90 | 90 | 90 |
| Contact angle | Water | 81° | 110° | 110° | 109° | 105° | 106° |
| | n-Hexadecane | cannot be measured | 70° | 70° | 69° | 68° | 69° |
| Pencil hardness (load: 1 kg) | | B | B | B | ≧B | B | B |
| Adherence (Squares test) | | — | 100/100 | 100/100 | 100/100 | 100/100 | 100/100 |
| KIMWIPE scratch resistance | | — | X | X | ○ | ○ | ○ |
| Oily ink wipe-off | | X | ○ | ○ | ○ | ○ | ○ |
| Solvent resistance | Methanol | X | X | X | ○ | ○ | ○ |
| | Acetone | X | X | X | X | X | X |

TFP: 1H, 1H, 3H-tetrafluoropropanol

APPLICATION EXAMPLE 4
Preparation of Acryl Coating Film Comprising PFPE Urethane Acrylate Composition
(Dip Coating of Acetone Solution on PMMA):

An acryl dispersion was prepared by adding 1 part of a photo-initiator, 2-methyl-2-morphorino(4-thiomethylphenyl)propan-1-one to 100 parts of a dispersion consisting of 33 parts of triethyleneglycol diacrylate, 33 parts by weight of dipentaerythritolhexaacrylate, 33 parts of hydroxyethyl acrylate and 3 parts of the PFPE urethane acrylate composition (2), and the acryl dispersion was dissolved in acetone so that the acrylate content is 0.5%. The mixture was filtered to give a solution.

A 5 cm×5 cm PMMA substrate (ACRYLITE L (having no hardcoat) and ACRYLITE MR (having hardcoat), manufactured by Mitsubishi Rayon Corp.) was immersed in the solution for several seconds, and rapidly pulled up. Acetone is evaporated to give a coating. The coating was cured at 60° C. for 1 to 2 hours and then by UV radiation to give a cured film. The UV irradiation was conducted by using a conveyer type UV irradiation apparatus. The irradiation amount necessary for the curing was 1.8 J/cm².

A contact angle; a pencil hardness, an adherence, a transmittance of all lights, a haze and a solvent resistance of the cured film were measured. The results are shown in Table 6.

A method of measuring the contact angle, the pencil hardness, the adherence and the solvent resistance were the same as in Application Example 3.

The transmittance of all lights was measured by U-3310 type spectrometer manufactured by HITACHI, and the haze was measured by a direct reading haze meter manufactured by Toyo Seiki Seisakusho Co., Ltd.

TABLE 6

| PMMA plate | | Substrate without hardcoat | | Substrate with hardcoat | |
|---|---|---|---|---|---|
| | | Before coating | After coating | Before coating | After coating |
| Contact angle | Water | 72 to 77° | 108 to 110° | 74 to 75° | 103 to 109° |
| | n-Hexadecane | cannot be measured | 64 to 68° | cannot be measured | 64 to 66° |
| Pencil hardness (load: 1 kg) | | 4H | 4H | 5H | 6H |
| Adherence (Squares test) | | — | 100/100 | — | 100/100 |
| Transmittance of all lights (%) | | 92.6 After UV irrad.: 91.5 | 91.7 | 92.0 After UV irrad.: 90.8 | 90.5 |
| Haze (%) | | 0.4 After UV irrad.: 0.5 | 0.2 | 0.4 After UV irrad.: 0.3 | 0.7 |
| Solvent resistance (Note) | Methanol | No change | No change in thick film Scratches in thin film | No change | No change |
| | Acetone | White and opaque | White and opaque | No change | No change |

(Note)
The film is rubbed with KIMWIPE soaked with solvent and appearance is observed.

Effects of the Invention

The composition of the present invention has the remarkably improved compatibility with diluents (particularly, fluorine-free diluents), and can form a strong film having excellent water-repellency, oil repellency, soil releasability and lubricability, firmly fixed to various substrates.

What is claimed is:

1. A composition containing a carbon-carbon double bond, which comprises:

(A) a triisocyanate prepared by trimerizing a diisocyanate, and (B) active hydrogen-containing compounds wherein the component (B) is a combination of at least two active hydrogen-containing compounds, and essentially consists of:

(B-1) a perfluoropolyether having at least one active hydrogen, and (B-2) a monomer having active hydrogen and a carbon-carbon double bond.

2. The composition according to claim 1, wherein the perfluoropolyether (B-1) has a compound which has one hydroxyl group at one molecular end, or one hydroxyl group at each of both molecular ends.

3. The composition according to claim 1, wherein the perfluoropolyether (B-1) is of the general formula:

4. The composition according to claim 1, wherein the component (B-1) is reacted with the NCO group present in the triisocyanate (A), and remaining NCO group is reacted with the component (B-2).

5. The composition according to claim 4, wherein the total amount of the active hydrogen possessed by the component (B-1) and the active hydrogen possessed by the component (B-2) is 3 mol, relative to 1 mol of the triisocyanate (A), and the molar ratio of active hydrogen of the monomer (B-1)/active hydrogen of the PFPE (B-2) is at most 1/2.

6. A composition containing a carbon-carbon double bond, which comprises:

(A) a triisocyanate prepared by trimerizing a diisocyanate, and (B) active hydrogen-containing compounds wherein the component (B) is a combination of at least two active hydrogen-containing compounds, and essentially consists of:

(B-1) a perfluoropolyether having at least one active hydrogen, (B-2) a monomer having active hydrogen and a carbon-carbon double bond and (B-3) a compound having active hydrogen, and the compound (B-3) is selected from the group consisting of a monohydric alcohol comprising a linear or branched hydrocarbon having 1 to 16 carbon atoms,

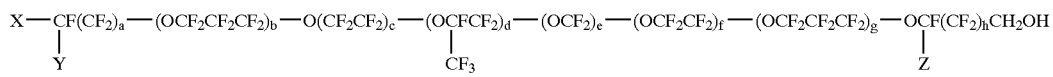

wherein X is a fluorine atom or a —CH$_2$OH group,
Y and Z are a fluorine atom or a trifluoromethyl group,
a is an integer of 1 to 16, c is an integer of 0 to 5, b, d, e, f and g are an integer of 0 to 200, and h is an integer of 0 to 16.

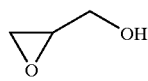

a secondary amine comprising a linear or branched hydrocarbon having 1 to 16 carbon atoms, a secondary amine containing an aromatic group, an Rf alcohol; $Q(CF_2)_l(CH=CH)_m(CHI)_n(CH_2)_oOH$ (wherein Q is a hydrogen atom, a fluorine atom or a $(CF_3)_2CF-$ group, l is an integer of 1 to 10, m and n is an integer of 0 to 1, and o is an integer of 1 to 10), $R(OCH_2CH_2CH_2)_qOH$ (R is a linear or branched hydrocarbon, an acetyl group, or an alkylphenoxy group having 1 to 16 carbon atoms, and p and q are an integer of 1 to 20), an aromatic alcohol, a silane compound having active hydrogen, $(CH_3)_3Si(CH_2)_sOH$ (wherein s is an integer of 1 to 20), $[(CH_3)_3]_2NH$,

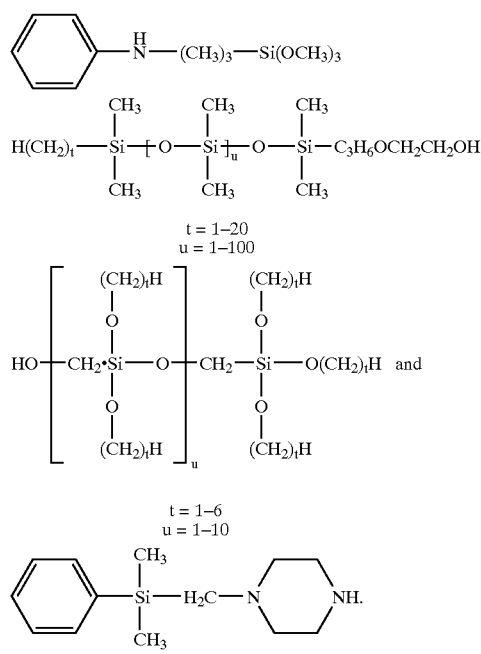

7. The composition according to claim 6, wherein the component (B-1) is reacted with the NCO group present in the triisocyanate (A), and the remaining NCO group is reacted with the component (B-2) and the component (B-3).

8. The composition according to claim 7, wherein the total amount of the active hydrogen possessed by the component (B-1), the active hydrogen possessed by the component (B-2) and the active hydrogen possessed by the component (B-3) is 3 mol, relative to 1 mol of the triisocyanate (A).

9. A polymer containing perfluoropolyether which is prepared by polymerizing the carbon-carbon double bond-containing composition according to claim 1.

10. A polymer containing perfluoropolyether prepared by polymerizing the carbon-carbon double bond-containing composition according to claim 1 and a monomer having a carbon-carbon double bond.

11. An article which is coated with the polymer according to claim 9.

12. A coating liquid comprising the carbon-carbon double bond-containing composition according to claim 1.

13. A coating liquid comprising:
(1) the carbon-carbon double bond-containing composition according to claim 1, and (2) a fluoroalcohol, a fluoroether or ditrifluoromethylbenzene.

14. An article having a perfluoropolyether film on a surface of the article, which is prepared by coating the coating liquid according to claim 11 on the surface of the article, and then polymerizing the coating liquid.

15. An optical material surface-coated with a film formed so that the content of perfluoropolyether in the carbon-carbon double bond-containing composition according to claim 1 is from 0.01% by weight to 10% by weight based on the film.

16. A method of purifying a compound having a carbon-carbon double bond and a perfluoropolyether group, which comprises:

precipitating the composition according to claim 1 with a nonpolar solvent, separating a high-boiling point reaction solvent from the precipitate, adding acetone and a polymerization inhibitor to the precipitate, and then removing a solution of the compound containing the carbon-carbon double bond and perfluoropolyether group from a reactor.

17. A polymer containing perfluoropolyether which is prepared by polymerizing the carbon-carbon double bond-containing composition according to claim 6.

18. A polymer containing perfluoropolyether prepared by polymerizing the carbon-carbon double bond-containing composition according to claim 6 and a monomer having a carbon-carbon double bond.

19. A coating liquid comprising the carbon-carbon double bond-containing composition according to claim 6.

20. A coating liquid comprising:
(1) the carbon-carbon double bond-containing composition according to claim 6, and
(2) a fluoroalcohol, a fluoroether or ditrifluoromethylbenzene.

21. A coating liquid comprising:
(1) the polymer according to claim 9, and
(2) a fluoroalcohol, a fluoroether or ditrifluoromethylbenzene.

22. A coating liquid comprising:
(1) the polymer according to claim 10, and
(2) a fluoroalcohol, a fluoroether or ditrifluoromethylbenzene.

23. An optical material surface-coated with a film formed so that the content of perfluoropolyether in the carbon-carbon double bond-containing composition according to claim 6 is from 0.01% by weight to 10% by weight based on the film.

24. An optical material surface-coated with a film formed so that the content of perfluoropolyether in the polymer according to claim 9 is from 0.01% by weight to 10% by weight based on the film.

25. An optical material surface-coated with a film formed so that the content of perfluoropolyether in the polymer according to claim 10 is from 0.01% by weight to 10% by weight based on the film.

* * * * *